United States Patent [19]

Braeken

[11] Patent Number: 6,075,088

[45] Date of Patent: Jun. 13, 2000

[54] ALKYD PAINTS

[75] Inventor: Josef Braeken, Denderleeuw, Belgium

[73] Assignee: Fina Research S.A., Feluy, Belgium

[21] Appl. No.: 08/332,690

[22] Filed: Nov. 1, 1994

[30] Foreign Application Priority Data

Nov. 2, 1993 [BE] Belgium ............................... 93203092

[51] Int. Cl.[7] ............................... C08J 5/10; C08K 3/22; C08L 75/00
[52] U.S. Cl. .......................... 524/590; 524/539; 524/589; 524/605; 524/607; 524/497
[58] Field of Search .................... 524/539, 556, 524/589, 590, 605, 607, 497

[56] References Cited

U.S. PATENT DOCUMENTS

| | | | |
|---|---|---|---|
| 3,345,388 | 10/1967 | Milligan et al. | 260/404.5 |
| 3,748,294 | 7/1973 | Kershaw et al. | 260/22 TN |
| 4,222,911 | 9/1980 | Christenson et al. | 260/22 TN |
| 4,591,518 | 5/1986 | Schillinger et al. | 427/385.5 |
| 4,677,181 | 6/1987 | Hohlein et al. | 528/74.5 |
| 4,689,266 | 8/1987 | Eckler | 428/334 |

FOREIGN PATENT DOCUMENTS 0301345  7/1988  European Pat. Off. .

*Primary Examiner*—James J. Seidleck
*Assistant Examiner*—U. K Rajguru
*Attorney, Agent, or Firm*—Michael J. Caddell; M. Norwood Cheairs

[57] ABSTRACT

High-solids air-drying or semi-drying alkyd paints essentially comprise, as binder, a conventional air-drying or semi-drying long-oil or medium-oil alkyd resin, and as reactive diluent an oligomer of polyol, polyisocyanate and unsaturated fatty acids. Use of the oligomer as reactive diluent is also claimed.

9 Claims, No Drawings

ALKYD PAINTS

CROSS REFERENCE TO RELATED APPLICATION

This application claims priority of a previously filed copending application in Belgium, application No. 93203092.7, filed on Nov. 2, 1993.

BACKGROUND OF THE INVENTION

The present invention relates to air-drying or semi-drying alkyd paints. More particularly, it relates to high-solids alkyd paints.

Environmental concern during the last years has led to a considerable demand for paints with a higher solids content. As used herein, "high-solids" refers to coatings with at most about 250 g/l of volatile organic compounds (VOCs).

High solids paints have long been known. However, historically they did not offer the same level of performance as presently known paints which have a higher solvent content. There is thus a demand for high-solids paints which perform at least as good as those everyone is currently using which have high VOCs.

The concept of reactive diluent is known in the art of high-solids paints (see e.g. Chapter 6 in High Solids Alkyd Resins, K. Holmberg, Dekker, 1987). European patent EP-357128-A discloses an alkyd-type reactive diluent. European patent EP-301345-A discloses a polyesterurethane containing ether groups and prepared from an isocyanate containing at least one copolymerisable double or triple carbon-carbon bond, used as a reactive diluent for oxidatively drying binders. The U.S. Pat. No. 4609706 discloses the use of hydroxy-functional oligomer reacted with a compound containing both one ethylenic unsaturation and one isocyanate functionality as reactive diluent for drying oil modified alkyd resin.

However, the performances obtained are insufficient, and there is a need in the art for high-solids air-drying or semi-drying paints having better properties.

It is an object of this invention to provide air-drying or semi-ring alkyd paints of higher solids content.

Another object of the invention is to provide air-drying or semi-drying alkyd paints of higher hiding power.

Still another object of the invention is to provide air-drying or semi-drying alkyd paints having improved drying properties.

Yet another object is to provide air-drying or semi-drying alkyd paints which can be applied in thicker layers without sagging.

A further object is to provide air-drying or semi-drying alkyd paints having an improved balance of the above objects.

Still a further object of the invention is to provide a reactive diluent that can be used in combination with conventional air-drying or semi-drying long-oil or medium-oil alkyd resins to formulate high-solids air-drying or semi-drying alkyd paints meeting one or more of the above objects.

SUMMARY OF THE INVENTION

High-solids air-drying or semi-drying alkyd paints comprising as binder, a conventional air-drying or semi-drying long-oil or medium-oil alkyd resin; as reactive diluent, an oligomer prepared by the reaction of a polyol, fatty acids and a polyisocyanate, the polyol having between 3 and 10 free alcohol groups and at most one ether group, the fatty acids having an iodine index greater than 125 and being used in an amount of from 0.70 to 0.80 mole per equivalent of alcohol group in the polyol, the polyisocyanate containing no copolymerizable C—C bond and being used in an amount of from 0.20 to 0.10 equivalent of isocyanate per equivalent of alcohol group in the polyol, such as to obtain an isocyanate number equal to zero, acid number below 10, hydroxyl number between 10 and 30 and a viscosity comprised between 1 and 30 dPa.s; at least one drier; and pigment, fillers and auxiliaries in sufficient amounts to limit VOCs to at most 250 g/l.

DESCRIPTION OF THE PREFERRED EMBODIMENTS

Accordingly, the high-solids air-drying or semi-drying alkyd paints of the invention essentially comprise as binders conventional air-drying or semi-drying long-oil or medium-oil alkyd resins. Alkyd resins are well-known in the art and are readily available commercially. They are the reaction product of the esterification of polyols with polybasic acids (or anhydrides) and fatty acids. Since the fatty acids act as chain terminators in the polyesterification reactions, the molecular weight is (among others) inversely dependent upon the relative amount of fatty acids. The alkyd resins used as binder in the paints of the invention are classified as "long oil" or "medium oil" and contain from 45 to 70 wt % of fatty acids calculated as triglycerides, preferably from 60 to 65wt % (Percentage oil length refers to the oil portion of an alkyd expressed as a weight percentage of the alkyd; it is equal to the total weight of fatty acids taken together with the weight of glycerol needed to completely esterify these fatty acids minus the weight of evolved water of esterification, expressed as percentage of the total solids in the alkyd).

The fatty acids used in the preparation of the alkyd resins must have an iodine number greater than 125 (semi-drying) or preferably 140 (drying), expressed in terms of the number of centigrams of iodine per gram of fatty acids (eg. ASTM test method D-1959). The resins preferably have an acid number (defined as mgKOH required to neutralize 1 g) smaller than 10.

It is conventional knowledge that such alkyds exhibit good drying properties. However, because of their molecular weight, they require an amount of solvent presently unacceptable (e.g. 30 to 40 wt % of white spirit to reach an acceptable viscosity).

The high-solids air-drying or semi-drying alkyd paints of the invention further comprise a reactive diluent which essentially consists of an oligomer which can be prepared by the reaction of a polyisocyanate with a polyol and fatty acids.

The polyisocyanate is an aliphatic and/or aromatic polyisocyanate (i.e. not containing any copolymerizable double or triple carbon-carbon bond), preferably a diisocyanate.

The polyol has between 3 and 10 free alcohol groups, preferably about 6, and may contain at most one ether group per molecule. Aliphatic polyols are preferred.

The oligomer (or mixture of oligomers) is prepared from 0.70 to 0.80 mole of fatty acids having an iodine number greater than 125, preferably greater than 140 particularly for use in air-drying paints, and from 0.20 to 0.10 mole of isocyanate group in the polyisocyanate per mole of hydroxyl in the polyol, such as to obtain isocyanate number equal to zero, acid number below 10 (preferably below 5), hydroxyl number between 10 and 30, and a viscosity comprised between 1 and 30 dPa.s preferably between 10 and 20 dPa.s (viscosity as used herein is measured at 23° C. with a Haake viscosimeter, using a spindle E100 at rotation speed nr.1).

While not wishing to be bound by any particular theory, the use of the hereabove described oligomers as reactive diluent for conventional air-drying or semi-drying long-oil or medium-oil alkyd resins to formulate high-solids air-drying or semi-drying alkyd paints is believed to be one important aspect of this invention.

The cure-process in air-drying or semi-drying involves oxidation, i.e. reaction with oxygen from the air. It is always performed in the presence of a catalyst, usually called a "drier" or "siccatived", which is usually a combination of metal salts. Those catalysts are well-known in the art and commercially available. Examples of suitable driers are metal salts of (cyclo)aliphatic, natural or synthetic acids, such as, for example, linoleic acid, naphthenic acid and 2-ethyl-hexanoic acid. Cobalt, manganese, lead, zirconium, calcium and zinc are suitable metals. Mixtures of driers can, of course, also be used. In terms of their metal content, the driers are used in a proportion of 0.001 to about 3% by weight, relative to the binder solids content.

The paints of the invention also contain, if appropriate, solvents/diluents (i.e. non-reactive compounds that do not remain in the dry coating), pigments, fillers and auxiliaries (particularly anti-settling and/or anti-skinning additives). Amounts of those components are such that the paints have a VOC content of at most about 250 g/l, preferably 100 g/l.

The invention also relates to coating compositions having a VOC content of at most 250 g/l and containing the air-drying or semi-drying long-oil or medium-oil alkyd resins described above as essential binders, the oligomers described above, according to the invention, as essential reactive diluent, driers and also, if appropriate, solvents/diluents, pigments, dyes, fillers and auxiliaries. As a result of employing the reactive diluents according to the invention it is possible to prepare coating compositions based on air-drying or semi-drying long-oil or medium-oil alkyd resins having a high solids content and meeting one or more objects of this invention.

Advantageously, the coating agents according to the invention have a solids content within the range of from 80 to 100% by volume (corresponding e.g. to the German "Blue Angel" requirements). It is thus also possible, by means of the reactive diluents according to the invention, to prepare readily brushable coating compositions based on air-drying or semi-drying long-oil or medium-oil alkyd resins in the absence of any solvent/diluent. The term solvent/diluent as used herein comprises all usual solvents/diluents, such as white spirit, or even water (up to about 5 vol %).

The invention also relates to a process for the preparation of the coating compositions according to the invention, in which the alkyd resin binders, the oligomer prepared in accordance with the invention, at least one drier and also, if appropriate, solvents/diluents, pigments, dyes, fillers, auxiliaries and driers are processed by mixing and, if appropriate, dispersion and grinding, to give a coating composition.

The weight ratio of binder to reactive diluent is from 90:10 to 50:50, preferably about 2:1. It can easily be adjusted by adding one or the other in the paint composition until the desired viscosity (generally between 5 and 15 dPa.s, preferably between 7.5 and 12 dPa.s, for brush or roller application) is obtained.

The coating compositions according to the invention are particularly suitable for use as decorative paints. They can be applied in adequately high layer thicknesses and have good hiding power and drying properties. In addition, the complete drying properties in particular can also be assessed as very good. While drying of one layer of certain compositions according to the invention may not be improved over the prior art, it is one advantage of the invention that since hiding power is improved, there is generally no need for a second layer so that overall drying is actually improved. The film formation of the coating compositions depends essentially on an oxidative drying; of course, if solvents are used, physical drying also takes place. The pigment volume concentration (PVC) should be adapted to the end use of the compositions, as known in the art; for example, varnishes have a PVC of zero, high gloss paints generally of up to about 20, maintenance paints generally of from 10 to 30 and primers generally of from 30 to 45.

The invention will be exemplified by means of the following illustrative examples:

Example 1 a. Preparation of a conventional alkyd resin

A conventional alkyd resin (hereinafter "A") is prepared in the conventional manner from soya oil, pentaerythritol and phthalic anhydride to obtain a resin with a phthalic anhydride content of 25wt %, an oil length of 64%, and a viscosity of 39 dPa.s when diluted as a 75wt % solution in white spirit.

b. Synthesis of the reactive diluent 75.053 parts by weight (pbw) of fatty acids having an iodine value of 140–150 (according to supplier's specifications) and 15.407 pbw of dipentaerythritol were introduced into a reactor and heated at 250° C. during one hour in the presence of 0.091 pbw of esterification catalyst.

After cooling at 70° C., 6.877 pbw of isophorone diisocyanate were slowly added, and the reactor was heated at 85° C. for 2 hours then at 100° C. for one hour.

The resulting oligomer, hereinafter "RD", had an acid index of 2, an hydroxyl index of 23.4 and an oil length of 88.1%, and was obtained with a yield of 94.2% of the monomers weight.

c. Preparation of a white paint

The following ingredients were mixed, dispersed and ground in the usual manner:

| | |
|---|---|
| alkyd A | 23.368 pbw |
| reactive diluent RD | 12.582 pbw |
| solvents/diluents | 16.872 pbw |
| driers (solid) | 2.888 pbw |
| titanium dioxide, rutile | 35.852 pbw |
| additives | 1.237 pbw |
| fillers and extenders | 6.573 pbw |

The resulting paint had a density of 1.389 g/ml, a viscosity of 9.5 dPa.s at 23° C. (measured with a Haake VT181 viscosimeter, using a spindle E100 at rotation speed nr.1), a PVC of 233%, a fineness comprised between 0.025 and 0.030 mm and contained 246 g of VOCs per liter.

The paint could be applied in layers of maximum thickness of at least 0.04 mm without sagging (maximum dry film thickness according to ASTM test method D4400-89a using procedure A). A leveling rating of "9" was determined using ASTM test method D2801-69. The drying properties were measured at 23° C. and 50% relative humidity with a BK-drying recorder (Sheen Instruments Ltd.):

| | |
|---|---|
| stage 1 | 90 minutes |
| stage 2 | 30 minutes after stage 1 |
| stage 3 | 13 hours after stage 2 |

The average contrast ratio measured according to ISO 2814-1973 on a 0.03 mm film (thickness of dry film obtained with an applicator having an opening of 0.075 mm) was of 96.44%.

In a cupping test according to ISO 1520-1973, using a mechanically driven indenter and a lens, the depth of indentation at which the coating started to crack was of 6.7 mm.

Visual determination of yellowing properties showed no difference between the samples and the best conventional high-voc paints known to the Applicants.

What is claimed is:

1. High-solids air-drying or semi-drying alkyd paints comprising:
   (i) as binder, a conventional air-drying or semi-drying long-oil or medium-oil alkyd resin
   (ii) as reactive diluent, an oligomer prepared by the reaction of a polyol, fatty acids and a polyisocyanate, the polyol having between 3 and 10 free alcohol groups and at most one ether group, the fatty acids having an iodine index greater than 125 and being used in an amount of from 0.70 to 0.80 mole per mole equivalent of alcohol group in the polyol, the polyisocyanate containing no copolymerisable C—C bond and being used in an amount of from 0.20 to 0.10 mole equivalent of isocyanate per mole equivalent of alcohol group in the polyol, such as to obtain an isocyanate number equal to zero, acid number below 10, hydroxyl number between 10 and 30 and a viscosity comprised between 1 and 30 dPa.s;
   (iii) at least one drier; and
   (iv) pigments, fillers and auxiliaries in sufficient amounts to limit VOCs to at most 250 g/l.

2. Paints according to claim 1, wherein the oligomer is prepared from a polyol having 6 free alcohol groups.

3. Paints according to claim 1, wherein the oligomer is prepared from a polyisocyanate having 2 isocyanate groups.

4. Paints according to claim 1, wherein the oligomer is prepared from fatty acids having an iodine index greater than 140.

5. Paints according to claim 1, wherein the oligomer has a viscosity of between 10 and 20 dPa.s.

6. Paints according to claim 1, wherein the weight ratio of binder to reactive diluent is from 9:1 to 5:5.

7. Paints according to claim 6, wherein the weight ratio of binder to reactive diluent is about 2:1.

8. Paints according to claim 1, characterized in that they have a viscosity of from 5 to 15 dPa.s.

9. Paints according to claim 1, characterized in that they have a volatile organic compounds content of at most 100 g/l.

* * * * *